No. 746,919. Patented December 15, 1903.

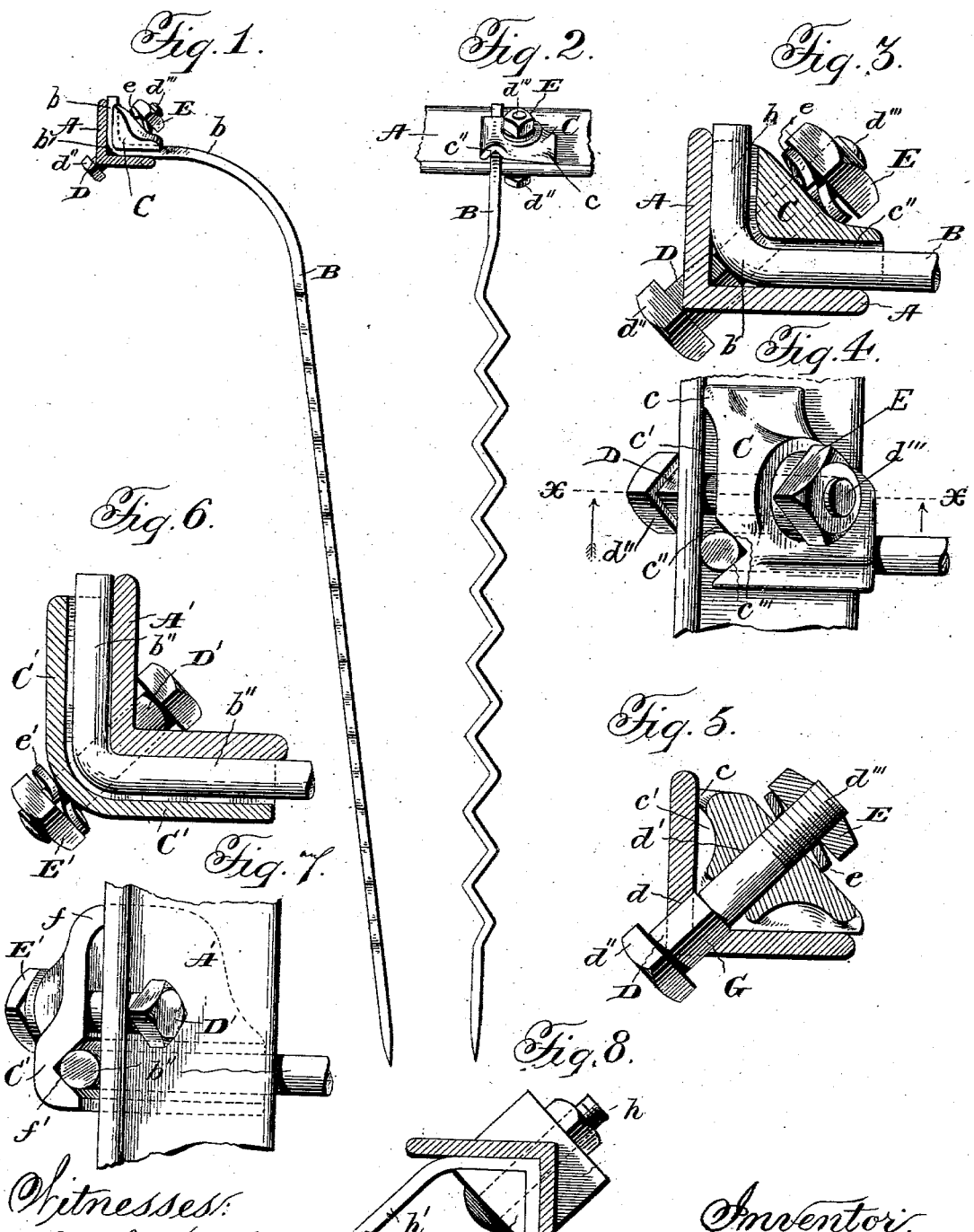

UNITED STATES PATENT OFFICE.

HIRAM M. BURDICK, OF UTICA, NEW YORK.

SECURING DEVICE FOR WEEDER-TEETH OR THE LIKE.

SPECIFICATION forming part of Letters Patent No. 746,919, dated December 15, 1903.

Application filed February 5, 1903. Serial No. 141,982. (No model.)

*To all whom it may concern:*

Be it known that I, HIRAM M. BURDICK, a citizen of the United States, residing at Utica, in the county of Oneida and State of New York, have invented certain new and useful Improvements in Securing Devices for Weeder-Teeth or the Like, of which the following is a specification, reference being had therein to the accompanying drawings.

This invention relates to improvements in securing devices for weeder-teeth and the like, and has for a primary object the provision of a device of this character which will effectually prevent any lateral play of the tooth with respect to its supporting-bar, and the consequent trail on the lines traversed by adjacent teeth, loosening of the parts, the sacrifice of time necessitated in readjusting the parts, and the loss of other advantages gained by a rigid construction.

With the above ends in view the invention contemplates a construction comprising an angle-bar constituting a support for the teeth and a clamping device for engaging the upper end of each tooth to bind the same within the angle of said supporting-bar or around the outer surface of said angle.

In the accompanying drawings, forming part hereof, a preferable embodiment of the invention is disclosed for the sake of facilitating a clear understanding of the invention; but this illustration being made simply for the purpose stated it is to be understood that in any future interpretation as to the scope of this invention I am not to be limited to any specific elements shown, except in so far as any such may be included in the appended claims.

Novel details in the construction and arrangement of the several parts of the device will be apparent from the detail description hereinafter given when read in connection with the drawings.

In the drawings, in which like reference characters refer to corresponding parts in the several views, Figure 1 is a side view of a spring-tooth and its securing device, the angle-bar being shown in section. Fig. 2 is a rear view of Fig. 1. Fig. 3 is a cross-sectional view of an angle-bar and securing device, the end of the tooth being shown in elevation. Fig. 4 is a top plan of Fig. 3. Fig. 5 is a cross-sectional view on the line $x\,x$ of Fig. 4. Figs. 6 and 7 are respectively a section and elevation of an embodiment of the invention, showing an arrangement slightly different from that of the other figures; and Fig. 8 is a detail of a still further modification.

Referring more specifically to the drawings, A designates an angle-bar of any preferred type, preferably the flanges of which extend at approximately right angles to each other.

B represent a spring-tooth, which it is desired shall be secured rigidly to the angle-bar, so as to be firmly held against any turning or lateral movement relative to said bar. The upper end of the tooth is bent upwardly, as at $b$, and is formed into an angle $b'$, approximately corresponding to the angle of the bar A, whereby the end of the tooth may fit closely within the angle-bar.

C is a clamping-block designed to embrace the end of the tooth just referred to and forcibly bind the same to the surface of the angle-bar. This block is provided with a bearing $c$ at one end which is in the nature of an angular flange fitting the angle of the bar A, while the remaining portion of the block is free from contact with said bar, as clearly indicated at $c'$. The inner surface of the block C adjacent to that end which is opposite the bearing $c$ is provided with a groove $c''$, tapering inwardly to provide two bearing-surfaces $c'''$, arranged to impinge upon the end of the tooth. Passing diagonally through the corner of the angle-bar A, an aperture $d$ being provided for the purpose, and through an alined aperture $d'$ in the block C is a clamping-bolt D, having a head $d''$ and screw-threaded end $d'''$, said bolt being of a length to extend somewhat beyond the exposed surface of said block and being engaged by a nut E, which in turn is locked in adjusted position by a split locking-washer $e$. By this arrangement it will be appreciated that when the parts are properly associated, with the end of the tooth inserted in the tapered groove of the clamping-block between the same and the surface of the angle-bar, the nut E may be screwed upon the bolt D to a sufficient extent to forcibly bind the end of the tooth in place within the angle of the bar A and that by having said bolt passing through the corner of the supporting-bar rather than through either flange thereof equal pressure is applied between each flange and the clamping-block. During this adjustment the block rocks upon its bearing c, and the more the opposite end of the block is forced toward the angle of the bar the greater the binding action between the same and said bar upon the end of the tooth. A tooth secured in place as herein stated, whether of angular or curved contour, will be positively held against any play whatsoever, either laterally relative to the supporting-bar or rotatably in its bearing.

Of course it is to be so understood that the threaded end of the clamping-bolt may project without the corner of the angle-bar instead of the headed end thereof, if desired.

In the modification shown in Figs. 6 and 7 the parts are practically the same as those before under consideration, the main distinction being that the clamping-block is fashioned to fit the exterior surface of the angle-bar rather than within the same and the end of the tooth is bound between the same and the outer surfaces and the corner of said angle-bar. In this instance also the head of the bolt is inside of the angle-bar. The parts of these figures are designated as follows: A' is the angle-bar; b'', the end of the tooth; C', the clamping-block; D', the locking-bolt; E', the nut engaging the threaded end of the bolt, and e' the locking-washer, while f and f' represent the bearing point or flange and tapered groove, respectively, corresponding to the elements c' and c'' of the first-described form of block.

To afford still additional means for preventing any loosening of the parts, the bolt may be angular for a portion of its length, as at G, Fig. 5, which will prevent the bolt from turning, the aperture into which said angular portion fits being of similar shape.

When the device is used for fastening flat teeth in place, the end of each tooth will be bent to fit between the angle-bar and the clamping-block, with one edge thereof adjacent to the flange c and the other edge thereof adjacent to the bolt D or with the bolt passing therethrough, depending upon the width of the material of which the teeth are formed.

In the form shown in Fig. 8 two angle clamping-blocks H and H' are employed, the one outside and the other inside of the angle-bar I, and the clamping screw-bolt h passes diagonally through them both, as well as through the flat tooth h'.

Having thus described the invention, what is claimed as new, and desired to be secured by Letters Patent, is—

1. In combination with an angle-bar, a tooth bent to conform to the angle of said bar, and means for securing the tooth to said bar comprising a clamping-block, and means for binding the tooth between the angle-bar and said clamping-block, the direction of tension of the binding means being in line with the corners of both the angle-bar and angular portion of the tooth.

2. In combination with an angle-bar, a tooth bent to conform to the angle of said bar, and means for securing the tooth to said bar comprising a clamping-plate binding the tooth between the same and the angle-bar, and means for causing the plate to impinge upon the tooth, the direction of movement of the plate being in line with the corners of both the angle-bar and angular portion of the tooth.

3. In combination with an angle-bar, a tooth bent to conform to the angle of said bar, and means for securing the tooth to said bar comprising a clamping-block binding the tooth between the same and the angle-bar, and a bolt for causing the block to impinge upon the angular portion of the tooth to force the same into the corner of the angle-bar, said bolt passing through the corner of the angle-bar.

4. In combination with an angle-bar, a tooth bent to conform to the angle of said bar, and means for securing the tooth to said bar comprising a clamping-block having a tapered groove in its inner surface receiving the tooth and binding the same between the block and the angle-bar, and means for causing the block to impinge upon the angular portion of the tooth to force the same into the corner of the angle-bar, the direction of movement of the block being in line with the corner of the angle-bar.

5. In combination with an angle-bar, a tooth bent to conform to the angle of said bar, and means for securing the tooth to said bar comprising a clamping-block having an angular flange corresponding to the angle of the angle-bar adjacent to one end of the same, said block binding the tooth between the same and the angle-bar, and means for causing the block to impinge upon the tooth, the direction of movement of the block being in line with the corner of the angle-bar.

6. In combination with an angle-bar, a tooth bent to conform to the angle of said bar, and means for securing the tooth to said bar comprising a clamping-block having an angular flange adjacent to one end of the same corresponding to the angle of the angle-bar, said block binding the tooth between the same and the angle-bar, and a bolt for causing the block to impinge upon the tooth, said bolt passing through the corner of the angle-bar.

7. In combination with an angle-bar, a tooth bent to conform to the angle of said bar, and means for securing the tooth to said bar comprising a clamping-block having a flange adjacent to one end of the same and a tapered groove following the angle of the angle-bar in its inner surface receiving the tooth and binding the same between the block and the angle-bar, and means for causing the block to impinge upon the tooth, the direction of movement of the block being in line with the corner of the angle-bar.

8. In combination with an angle-bar, a tooth bent to conform to the angle of said bar, and means for securing the tooth to said bar comprising a clamping-block having a groove following the angle of the angle-bar in its inner surface receiving the tooth and binding the same between the block and the angle-bar, and means for causing the block to impinge upon the tooth, the direction of movement of the block being in line with the corner of the angle-bar.

9. A clamping-block of the character described, having a groove angular in cross-section in its inner surface following an angular course substantially as and for the purpose described.

10. A clamping-block of the character described, having a groove in its inner surface following an angular course, and an aperture passing diagonally through the block.

11. A clamping-block of the character described, having a flange angular in length on its inner surface adjacent to one end following an angular course, and an aperture passing diagonally through the block.

12. A clamping-block of the character described, having an angular inner surface and a flange adjacent to one end thereof, and a groove in said surface following the angle thereof.

In testimony whereof I affix my signature in presence of two witnesses.

HIRAM M. BURDICK.

Witnesses:
A. J. FOLEY,
SEWARD A. MILLER.